(12) United States Patent
Hong et al.

(10) Patent No.: US 6,915,033 B2
(45) Date of Patent: Jul. 5, 2005

(54) MULTI-CHANNEL OPTICAL SWITCH AND METHOD FOR MANUFACTURING THE SAME

(75) Inventors: Suk Kee Hong, Seoul (KR); Yeong Gyu Lee, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 75 days.

(21) Appl. No.: 10/689,632

(22) Filed: Oct. 22, 2003

(65) Prior Publication Data

US 2004/0264849 A1 Dec. 30, 2004

(30) Foreign Application Priority Data

Jun. 26, 2003 (KR) .................................. 10-2003-0041865

(51) Int. Cl.[7] .................................................. G02B 6/26
(52) U.S. Cl. .......................................... 385/22; 385/18
(58) Field of Search ............................. 385/16, 17, 18, 385/19, 20, 22, 31, 39, 42, 43; 398/48; 359/209

(56) References Cited

U.S. PATENT DOCUMENTS

| | | | |
|---|---|---|---|
| 5,446,815 A | * | 8/1995 | Ota et al. ..................... 385/33 |
| 6,259,835 B1 | * | 7/2001 | Jing ............................. 385/18 |
| 6,711,318 B2 | * | 3/2004 | Hamerly et al. ............... 385/18 |
| 6,791,235 B2 | * | 9/2004 | Miller et al. ................. 310/311 |
| 6,856,712 B2 | * | 2/2005 | Fauver et al. ................ 385/12 |
| 2002/0064341 A1 | * | 5/2002 | Fauver et al. ................ 385/25 |
| 2003/0160540 A1 | * | 8/2003 | Miller et al. ................. 310/309 |
| 2003/0223748 A1 | * | 12/2003 | Stowe et al. ................. 398/48 |
| 2004/0101234 A1 | * | 5/2004 | Miller et al. ................. 385/18 |
| 2004/0113515 A1 | * | 6/2004 | Miller et al. ................. 310/309 |
| 2004/0113516 A1 | * | 6/2004 | Miller et al. ................. 310/309 |

* cited by examiner

*Primary Examiner*—Akm Enayet Ullah
(74) *Attorney, Agent, or Firm*—Lowe Hauptman & Berner, LLP

(57) ABSTRACT

Disclosed are a multi-channel optical switch and a method for manufacturing the same. The multi-channel optical switch includes a supporter; an input terminal optical fiber fixed to the supporter for inputting an optical signal to be switched therethrough; multiple output terminal optical fibers fixed to the supporter for outputting the optical signal inputted through the input terminal optical fiber therethrough; multiple micro mirrors for reflecting the optical signal inputted through the input terminal optical fiber and then for directing the optical signal to a designated output terminal optical fiber among the multiple output terminal optical fibers; and multiple actuators respectively connected to the micro mirrors for adjusting the positions of the micro mirrors so that the optical signal is reflected by the micro mirrors.

13 Claims, 7 Drawing Sheets

# MULTI-CHANNEL OPTICAL SWITCH AND METHOD FOR MANUFACTURING THE SAME

BACKGROUND OF THE INVENTION

1. Field of the Invention

The present invention relates to an optical switch adapted as an essential part in a WDM optical communication network, and more particularly to an apparatus for switching optical signals of multiple channels and a method for manufacturing the apparatus.

2. Description of the Related Art

Generally, an optical switch serves to change a route of an optical signal transmitted through an optical fiber in a Wavelength Division Multiplexing (hereinafter, referred to as "WDM") optical communication network. The optical switch has been recently developed to employ a Micro Electro Mechanical System (hereinafter, referred to as "MEMS") technique.

FIGS. 1a and 1b are schematic views respectively illustrating a structure and a switching operation of a conventional MEMS optical switch.

With reference to FIGS. 1a and 1b, the conventional MEMS optical switch employs a method in which light emitted from an input terminal optical fiber due to the displacement of an actuator having a MEMS structure is reflected by a micro mirror and then transmitted in at least two directions.

As shown in FIGS. 1a and 1b, the conventional MEMS optical switch comprises an input terminal optical fiber 11 to which an optical signal to be switched is inputted, a first output terminal optical fiber 12 arranged with the input terminal optical fiber 11 in a straight line, and a second output terminal fiber 13 arranged perpendicularly to the input terminal optical fiber 11. The conventional MEMS optical switch further comprises a micro mirror 14 located between the input terminal optical fiber 11 and the first and second output terminal optical fibers 12 and 13 for changing the direction of the inputted optical signal by means of reflection, and an actuator 15 for driving the micro mirror 14.

Hereinafter, a principle of the MEMS optical switch for switching the optical signal will be described in detail. As shown in FIG. 1a, the actuator 15 drives the micro mirror 14 such that the micro mirror 14 is moved to the opposite direction of the second output terminal optical fiber 13. Then, the optical signal inputted to the input terminal optical fiber 11 travels in parallel, and goes ahead through the first output terminal optical fiber 12.

On the other hand, as shown in FIG. 1b, the actuator 15 drives the micro mirror 14 such that the micro mirror 14 is moved to the direction of the second output terminal optical fiber 13 and located between the input terminal optical fiber 11 and the first and second output terminal optical fibers 12 and 13. Then, the optical signal inputted from the input terminal optical fiber 11 is reflected by the micro mirror 14 and goes ahead through the second output terminal optical fiber 13. The conventional MEMS optical switch switches the optical signal using the above principle, thereby having advantages such as an increased switching speed and a reduced rate of power consumption.

In order to process an optical signal with a large capacity so as to satisfy the rapid increase of subscribers of the optical communication network, a technique for providing signal-switching to multiple channels is required. However, the conventional MEMS optical switch using the micro mirror and the actuator has problems in that it is difficult to process the multiple channels due to characteristics of the optical signal and difficulty in packaging.

SUMMARY OF THE INVENTION

Therefore, the present invention has been made in view of the above problems, and it is an object of the present invention to provide an optical switch comprising multiple channels for effectively processing an optical signal with a large capacity and a method for manufacturing the optical switch.

It is another object of the present invention to provide an optical switch for supplying an optical signal with uniform optical performance throughout optical routes of multiple channels and a method for manufacturing the optical switch.

In accordance with one aspect of the present invention, the above and other objects can be accomplished by the provision of a multi-channel optical switch comprising: a supporter; an input terminal optical fiber fixed to the supporter for inputting an optical signal to be switched therethrough; multiple output terminal optical fibers fixed to the supporter for outputting the optical signal inputted through the input terminal optical fiber therethrough; multiple micro mirrors for reflecting the optical signal inputted through the input terminal optical fiber and then for directing the optical signal to a designated output terminal optical fiber among the multiple output terminal optical fibers; and multiple actuators respectively connected to the micro mirrors for adjusting the positions of the micro mirrors so that the optical signal is reflected by the micro mirrors.

Preferably, the multi-channel optical switch may further comprise multiple lenses fixed to the supporter and respectively separated from the optical fibers by a designated distance for collimating the optical signal transmitted and received through the optical fibers so that the optical signal has uniform optical performance throughout a constant optical path.

Further, preferably, the multi-channel optical switch may further comprise a housing surrounding an upper portion of the supporter.

In accordance with another aspect of the present invention, there is provided a method for manufacturing a multi-channel optical switch comprising the steps of: (a) forming grooves for receiving multiple optical fibers, multiple lenses, multiple micro mirrors and multiple actuators in a supporter; (b) fixing the lenses, which are polished to adjust their sizes and incident surfaces, to the supporter; (c) inserting the optical fibers into the grooves of the supporter, said optical fibers being respectively spaced from the lenses by a designated air gap so that the lenses have uniform optical performance throughout a designated optical path; (d) finely adjusting the inserted optical fibers, and then fixing the adjusted optical fibers to the supporter; and (e) arranging the micro mirrors and the actuators at corresponding positions on the supporter so that the optical signal is reflected by the micro mirrors toward a designated channel.

Preferably, the method may further comprise the step of (f) surrounding an upper portion of the supporter with a housing.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
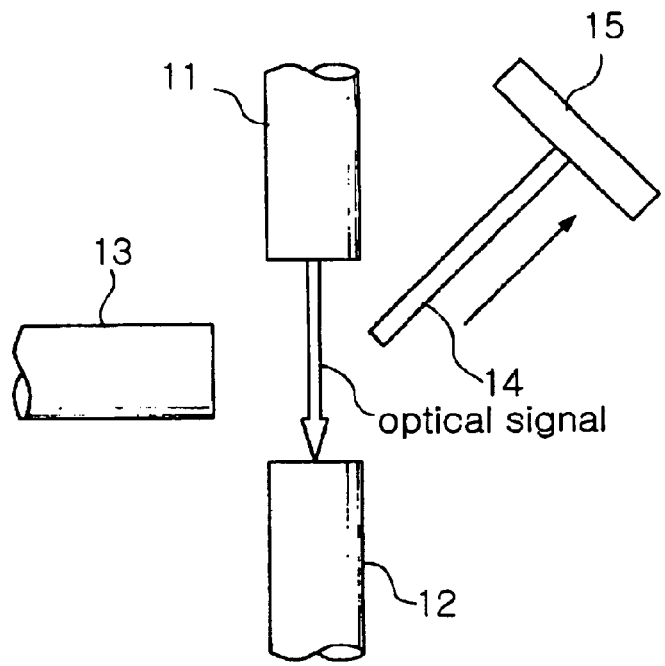
FIG. 1a is a schematic view illustrating a structure of a conventional MEMS optical switch.
Figure 1B:
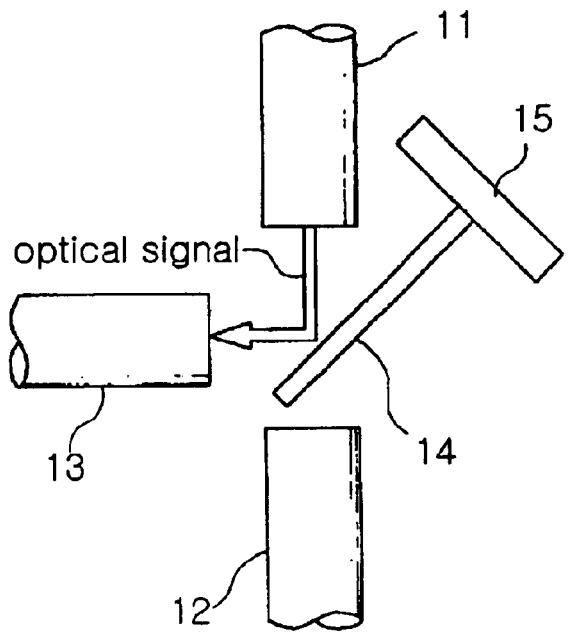
FIG. 1b is a schematic view illustrating a switching operation of the conventional MEMS optical switch.

Now, embodiments of the present invention will be described in detail with reference to the annexed drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

Figure 2:
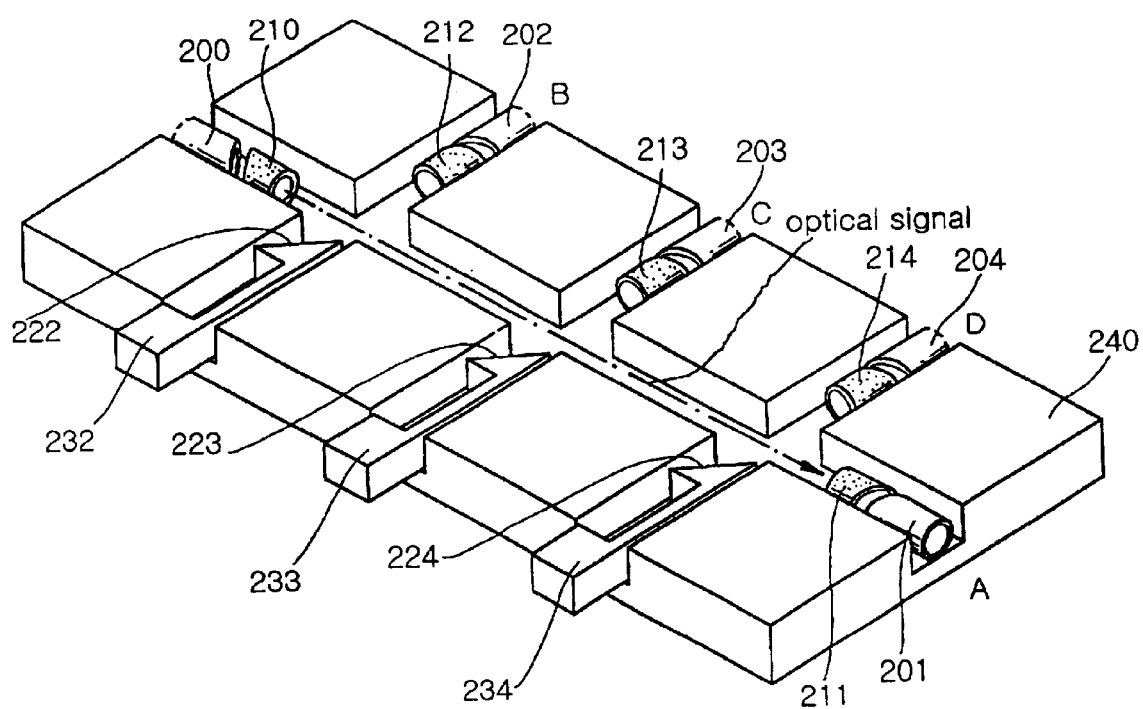
FIG. 2 is a schematic view of a structure of a multi-channel optical switch in accordance with an embodiment of the present invention.

FIG. 2 is a schematic view of a structure of a multi-channel optical switch in accordance with an embodiment of the present invention.

With reference to FIG. 2, the multi-channel optical switch comprises an input terminal optical fiber 200, multiple output terminal optical fibers 201 to 204, lenses 210 to 214 in number corresponding to the number of the output terminal optical fibers 201 to 204, micro mirrors 222 to 224, and actuators 232 to 234. The input terminal optical fiber 200, the output terminal optical fibers 201 to 204, the lenses 210 to 214, the micro mirrors 222 to 224, and the actuators 232 to 234 are located on a supporter 240 made of a silicon wafer.

Although this embodiment of the present invention comprises four channels A, B, C and D, the multi-channel optical switch may comprise channels having the number of more than four.

An optical signal to be switched is inputted to the input terminal optical fiber 200. The first output terminal optical fiber 201 and the input terminal optical fiber 200 are arranged in a straight line. The second, third and fourth output terminal optical fibers 202, 203 and 204 are perpendicular to the input terminal optical fiber 200 so that the channels B, C and D are located between the input terminal optical fiber 200 and the first output terminal optical fiber 201.

The micro mirrors 222, 223 and 224 for changing the direction of the optical signal are formed such that the optical signal inputted through the input terminal optical fiber 200 is reflected by the micro mirrors 222, 223 and 224 and then outputted through the second, third and fourth output terminal optical fibers 202, 203 and 204. Each of the micro mirrors 222, 223 and 224 is oblique to the perpendicular plane formed by the input terminal optical fiber 200 and the corresponding one of the second, third and fourth output terminal optical fibers 202, 203 and 204, at an inclination of approximately 45 degrees.

The actuators 232, 233 and 234 are formed so as to allow the micro mirrors 222, 223 and 224 to perform a switching operation. The micro mirrors 222, 223 and 224 are respectively attached to one end of each of the actuators 232, 233 and 234, and operated for switching the optical signal by the control of the actuators 232, 233 and 234. Here, the micro mirrors 222, 223 and 224, and the actuators 232, 233 and 234 are designed such that they are separately produced and then combined together, or integrally produced.

In accordance with another embodiment of the present invention, the lenses 210, 211, 212, 213 and 214 for collimating the optical signal are formed on the supporter 240 made of the silicon wafer. For example, the first lens 210 serves to allow the optical signal, which is inputted through the input terminal optical signal 200 and then outputted through the first output terminal optical signal 201 in the structure of the switching system shown in FIG. 2, to uniformly travel in parallel without waveform distortion by a designated distance. As described above, the switching system of this embodiment of the present invention provides the optical signal having uniform characteristics throughout optical traveling paths among the channels A, B, C and D and optical performance (insertion loss, PDL, and return loss) in an allowable tolerance range to the channels A, B, C and D. That is, as shown in FIG. 2, although there is a difference in the distance of the optical path between one end of the input terminal optical fiber 200 and each of the channels B, C and D perpendicular to the input terminal optical fiber 200, the optical performance of the optical signal transmitted to the channels B, C and D is uniformly maintained.

FIGS. 3a to 3d are schematic views illustrating a switching operation of the multi-channel optical switch in accordance with one embodiment of the present invention. Here, the optical traveling path between the input terminal optical fiber 200 between the first output terminal optical fiber 201 is defined as "a main optical traveling path".

Figure 3A:
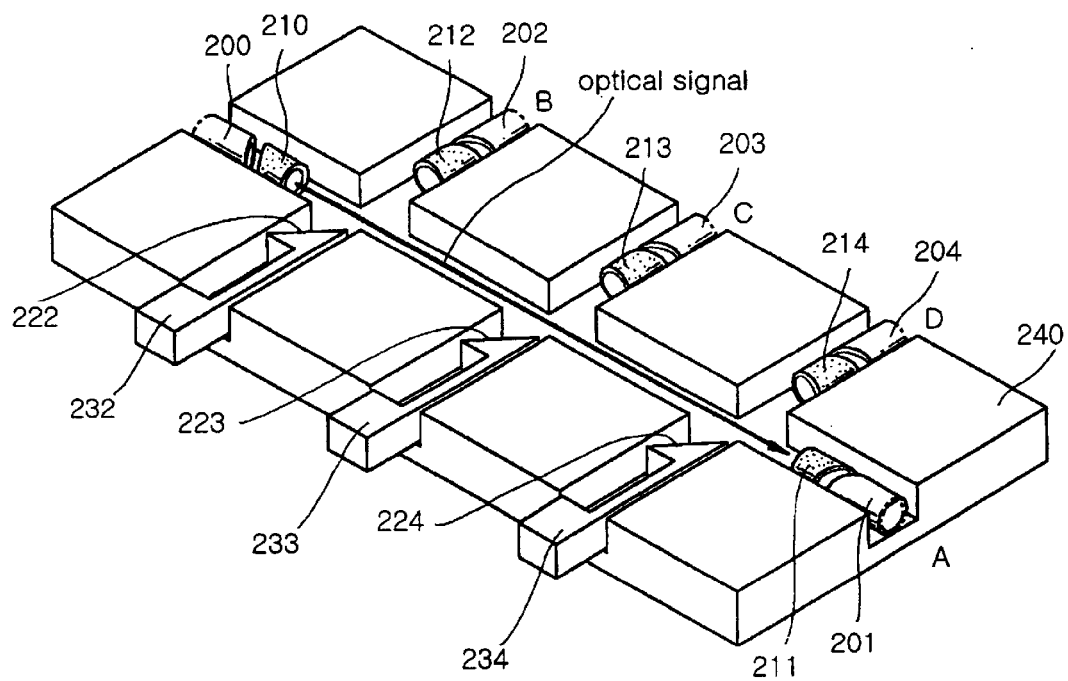
FIGS. 3a to 3d are schematic views illustrating a switching operation of the multi-channel optical switch in accordance with the embodiment of the present invention.

With reference to FIG. 3a, in order to output the optical signal, inputted through the input terminal optical fiber 200, via the channel A, all of the actuators 232, 233 and 234 are operated so that the micro mirrors 222, 223 and 224 are retracted from the main optical traveling path. Accordingly, the optical signal inputted through the input terminal optical fiber 200 goes straight ahead along the main optical traveling path, and then is outputted to the channel A.

Figure 3B:
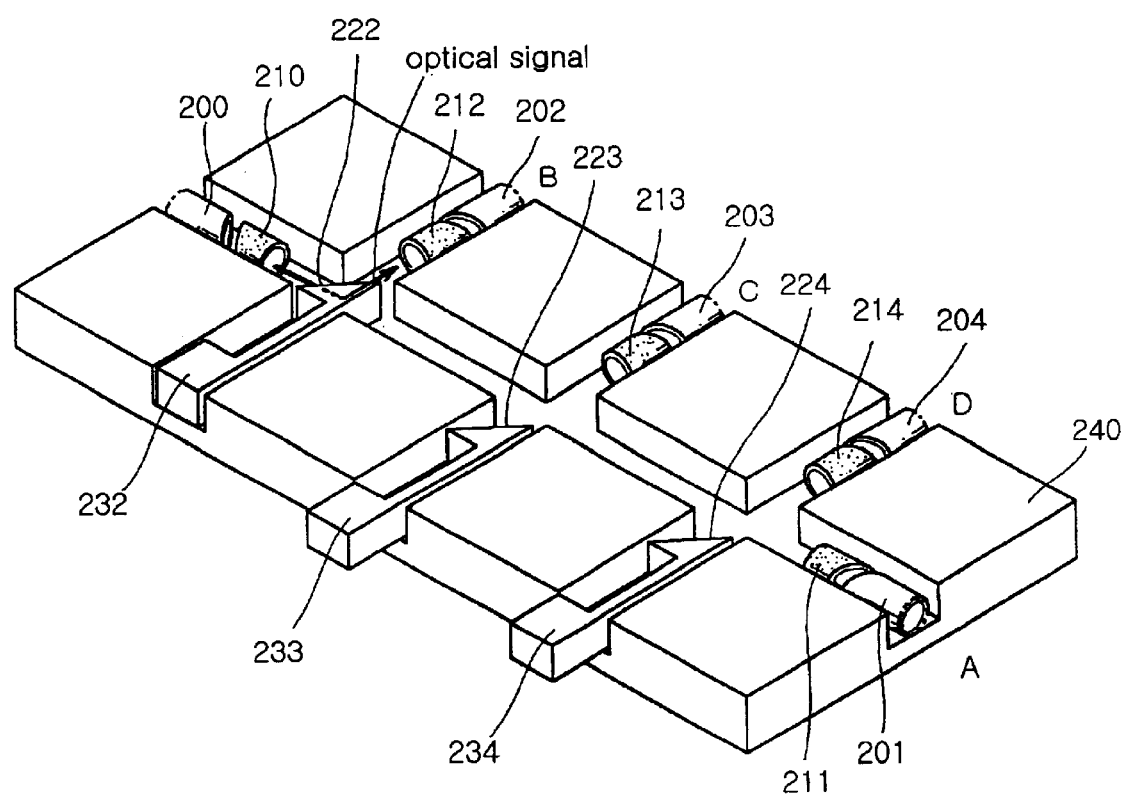

With reference to FIG. 3b, in order to output the optical signal, inputted through the input terminal optical fiber 200, via the channel B, the actuators 232, 233 and 234 are operated so that the first micro mirror 222 is positioned on the main optical traveling path. Then, the optical signal inputted through the input terminal optical fiber 200 is reflected by the first micro mirror 222, and is then outputted to the channel B.

Figure 3C:
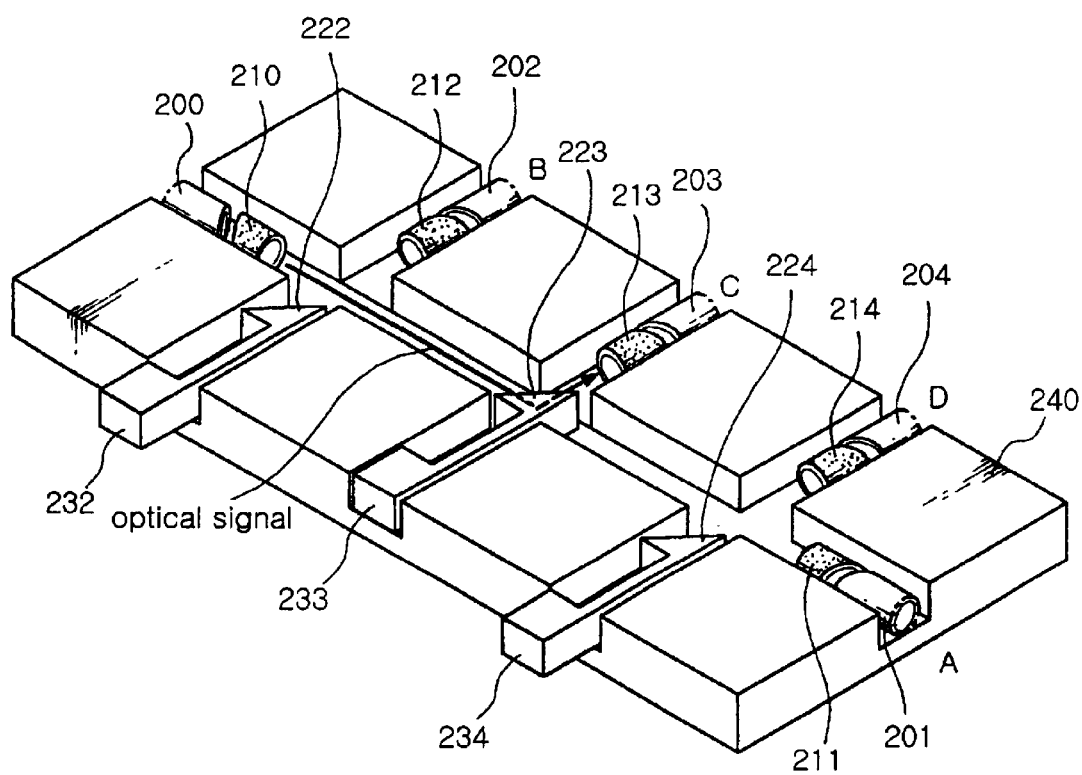
Figure 3D:
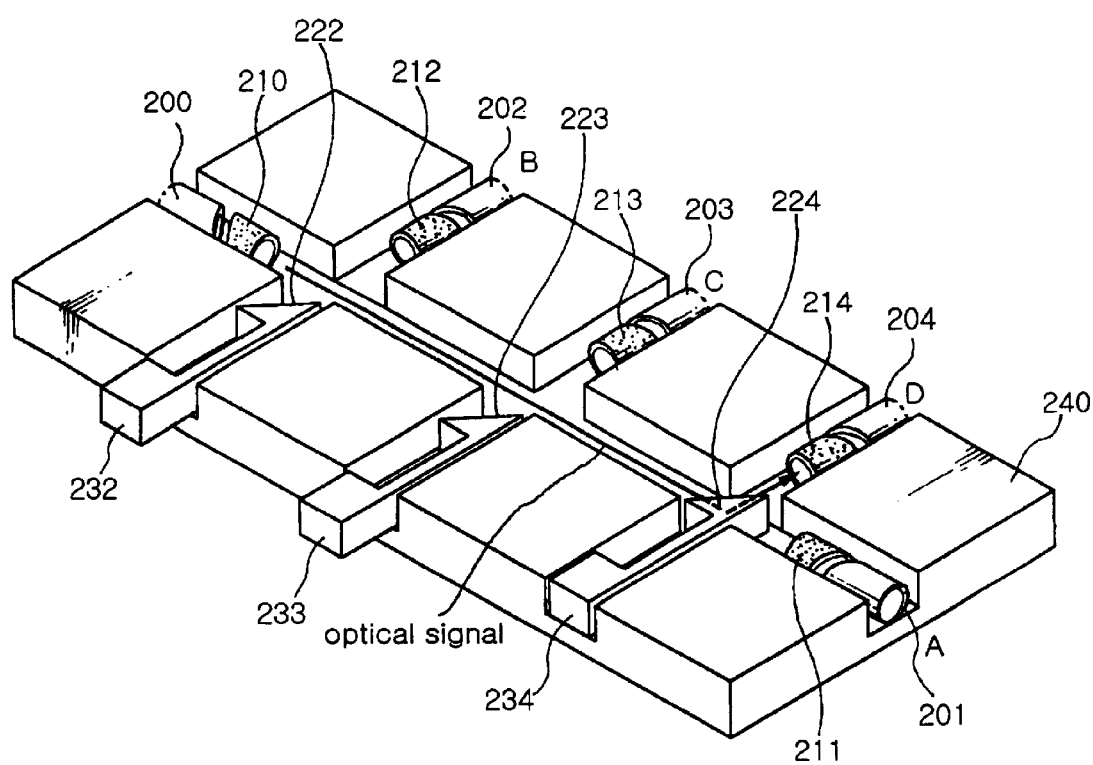

In the same manner as FIG. 3b, with reference to FIG. 3c, in case that the first micro mirror 222 is retracted from the main optical traveling path and the second micro mirror 223 is positioned on the main optical traveling path, the optical signal inputted through the input terminal optical fiber 200 is reflected by the second micro mirror 223, and is then outputted to the channel C. Further, with reference to FIG. 3d, in case that the first and second micro mirrors 222 and 223 are retracted from the main optical traveling path and the third micro mirror 224 is positioned on the main optical traveling path, the optical signal inputted through the input terminal optical fiber 200 is reflected by the third micro mirror 224, and is then outputted to the channel D.

Figure 4:
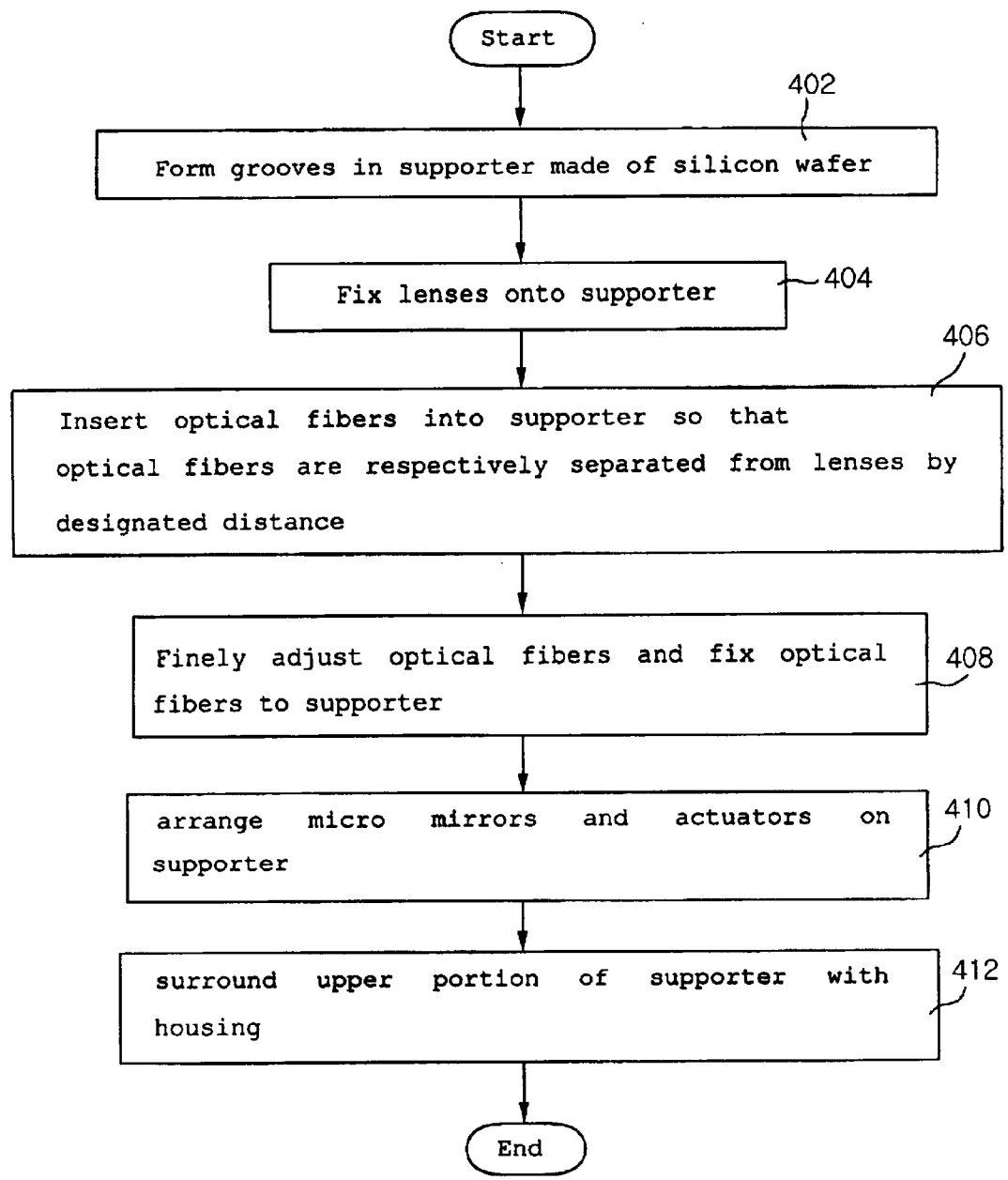
FIG. 4 is a flow chart illustrating a process for manufacturing the multi-channel optical switch in accordance with the embodiment of the present invention.

FIG. 4 is a flow chart illustrating a process for manufacturing the multi-channel optical switch in accordance with one embodiment of the present invention.

First, in step 402, grooves for receiving optical fibers, lenses, micro mirrors and actuators are formed in a supporter made of a silicon wafer.

In step 404, the lenses are polished to adjust their sizes and incident surfaces, and then fixed to the supporter. Here, an epoxy is adapted to fix the lenses to the supporter.

In step 406, optical fibers, whose ends are polished at an angle of 8 degrees to the lenses, are inserted into the grooves of the supporter. Here, the optical fibers are respectively spaced from the lenses by a designated air gap so that the lenses have uniform optical performance throughout a designated optical path.

In step 408, the inserted optical fibers are finely adjusted, and then fixed to the supporter.

In step 410, the micro mirrors and the actuators are respectively located at corresponding positions on the supporter.

In step 412, in order to protect the above components of the manufactured optical switch from the outside, the upper surface of the supporter is surrounded by a housing. Thereby, manufacture of the optical switch in accordance with the embodiment of the present invention is completed by the above-described steps.

As apparent from the above description, the present invention provides an optical switch comprising multiple channels for effectively processing an optical signal with a large capacity, and a method for manufacturing the optical switch.

Further, the optical switch supplies an optical signal with uniform optical performance throughout optical routes of multiple channels, thereby being improved in terms of communicating performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-channel optical switch comprising:

a supporter;

an input terminal optical fiber fixed to the supporter for inputting an optical signal to be switched therethrough;

multiple output terminal optical fibers fixed to the supporter for outputting the optical signal inputted through the input terminal optical fiber therethrough;

multiple micro mirrors for reflecting the optical signal inputted through the input terminal optical fiber and then for directing the optical signal to a designated output terminal optical fiber among the multiple output terminal optical fibers; and multiple lenses fixed to the supporter and respectively separated from the optical fibers by a designated distance for collimating the optical signal transmitted and received through the optical fibers so that the optical signal has uniform optical performance throughout a constant optical path;

multiple actuators respectively connected to the micro mirrors for adjusting the positions of the micro mirrors so that the optical signal is reflected by the micro mirrors.

2. The multi-channel optical switch as set forth in claim 1, further comprising multiple lenses fixed to the supporter and respectively separated from the optical fibers by a designated distance for collimating the optical signal transmitted and received through the optical fibers so that the optical signal has uniform optical performance throughout a constant optical path.

3. The multi-channel optical switch as set forth in claim 1, further comprising a housing surrounding an upper portion of the supporter.

4. The multi-channel optical switch as set forth in claim 1, wherein the supporter is made of a silicon wafer.

5. The multi-channel optical switch as set forth in claim 1, wherein the optical fibers are fixed to the supporter by an epoxy.

6. The multi-channel optical switch as set forth in claim 1, wherein the optical fibers and the lenses are fixed to the supporter by an epoxy.

7. A method for manufacturing a multi-channel optical switch comprising the steps of:

(a) forming grooves for receiving multiple optical fibers, multiple lenses, multiple micro mirrors and multiple actuators in a supporter;

(b) fixing the lenses, which are polished to adjust their sizes and incident surfaces, to the supporter;

(c) inserting the optical fibers into the grooves of the supporter, said optical fibers being respectively spaced from the lenses by a designated air gap so that the lenses have uniform optical performance throughout a designated optical path;

(d) finely adjusting the inserted optical fibers, and then fixing the adjusted optical fibers to the supporter; and (e) arranging the micro mirrors and the actuators at corresponding positions on the supporter so that the optical signal is reflected by the micro mirrors toward a designated channel.

8. The method as set forth in claim 7, further comprising the step of (f) surrounding an upper portion of the supporter with a housing.

9. The method as set forth in claim 7, wherein the optical fibers and the lenses are fixed to the supporter by an epoxy.

10. An optical collimating apparatus comprising:

a supporter;

optical fibers fixed to the supporter for transmitting and receiving an optical signal; and lenses fixed to the supporter and respectively separated from the optical fibers by a designated distance for collimating the optical signal transmitted and received through the optical fibers so that the optical signal has uniform optical performance throughout a constant optical path.

11. The optical collimating apparatus as set forth in claim 10, further comprising a housing surrounding an upper portion of the supporter.

12. A method for manufacturing an optical collimating apparatus comprising the steps of:

(i) forming grooves for receiving optical fibers and lenses in a supporter;

(ii) fixing the lenses, which are polished to adjust their sizes and incident surfaces, to the supporter;

(iii) inserting the optical fibers into the grooves of the supporter, said optical fibers being respectively spaced from the lenses by a designated air gap so that the lenses have uniform optical performance throughout a designated optical path; and (iv) finely adjusting the inserted optical fibers, and then fixing the adjusted optical fibers to the supporter.

13. The method as set forth in claim 12, further comprising the step of (v) surrounding an upper portion of the supporter with a housing.

* * * * *